April 20, 1937. C. ELLIS 2,077,994
DEHYDROGENATED FUEL
Filed Sept. 14, 1933
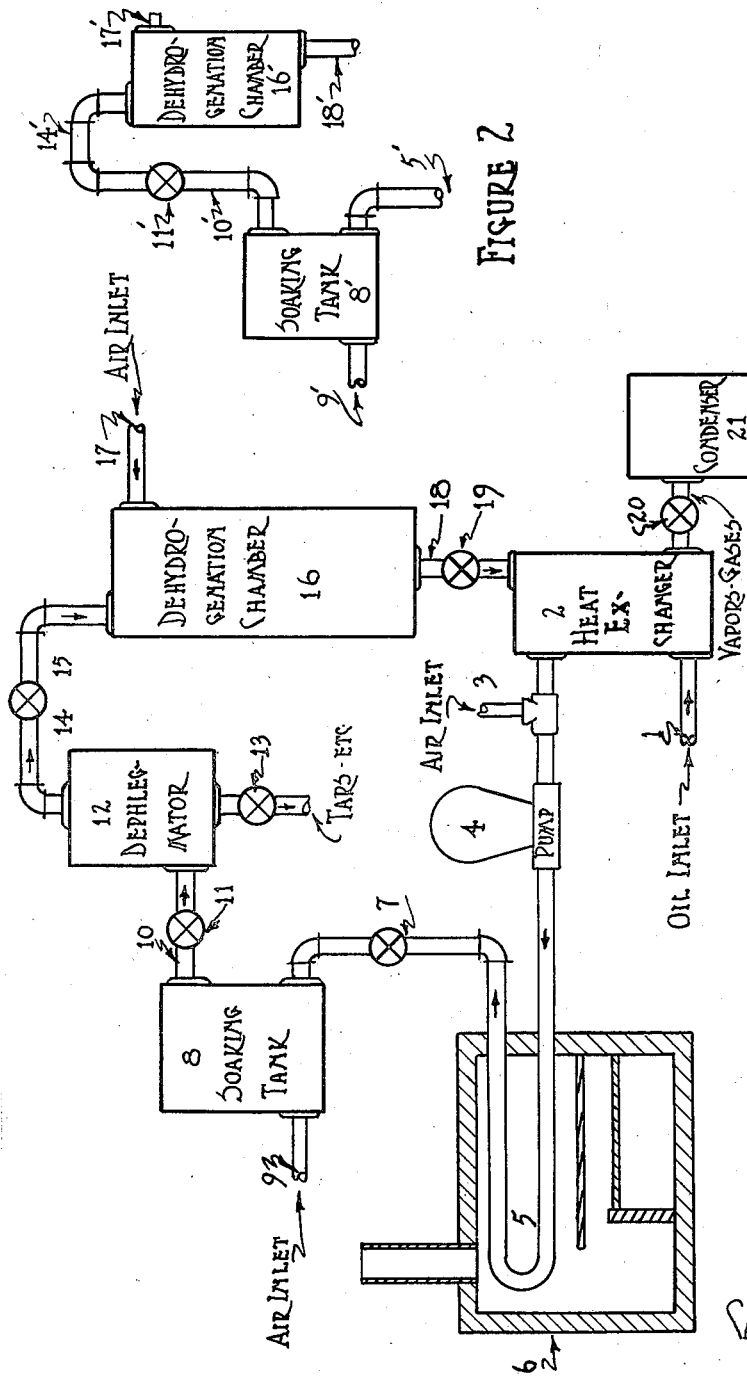
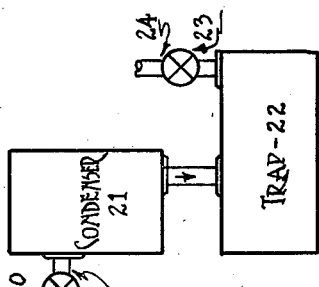
INVENTOR
CARLETON ELLIS
BY Nathaniel L. Foster
ATTORNEY Patented Apr. 20, 1937

2,077,994

UNITED STATES PATENT OFFICE 2,077,994

DEHYDROGENATED FUEL

Carleton Ellis, Montclair, N. J., assignor to Ellis-Foster Company, a corporation of New Jersey Application September 14, 1933, Serial No. 689,429

2 Claims. (Cl. 196—65)

This invention relates to a self-adjusted motor fuel containing self-made correctives of combustion disturbances and to the process of making same and relates especially to a pressure-cracked modified motor fuel having desirable characteristics.

This application is a continuation in part of Serial No. 629,799½, filed April 4, 1923 and Serial No. 709,915, filed April 29, 1924. It is also a continuation in part of Serial No. 538,338, filed Feb. 21, 1922.

The invention has for one object the production of a modified gasoline or gasoline-substitute relatively free from those objectionable qualities such as knocking which interfere with the proper utilization of ordinary gasoline and which call for the addition of foreign substances as remedies; such as lead and tin ethyl compounds, iodine, or various other so-called tonics and palliatives.

According to the present invention ordinary gasoline or preferably gasoline made by a cracking operation, preferably under high pressure, may be caused to acquire such a constitution or composition by appropriate treatment that the addition of metal "dopes" or "tonics" is unnecessary; in other words that the composite character of gasoline affords within itself the potential material for correction of its defects without resorting to foreign substances, which in many cases doubtless are capable of producing unpleasant side reactions, poisonous effects, etc.

The product from the cracking operation is a complex mixture of saturated and unsaturated hydrocarbons, aromatic, naphthenic and paraffin bodies and other substances. Aromatic hydrocarbons possess desirable properties of minimizing engine knock and it is a feature of the present invention to increase the content of such knock-minimizing substances in various ways such as by an oxidation reaction of other cyclic compounds present, particularly naphthenic compounds, whereby hydrogen is removed by combination with oxygen to form water, and aromatic compounds are obtained. These oxygen-engendered aromatic substances, together with the other constituents of the mixture, comprise a self-adjusted motor fuel in which engine knock is greatly reduced. Another feature of this invention insofar as it may involve dehydrogenation by the use of oxygen is the oxidation of the readily oxidized unsaturated hydrocarbons including certain olefins with the object of reducing carbon deposition in engine cylinders.

More specifically the invention relates to a motor fuel comprising cracked gasoline containing substances causing engine-knock and thermolytically-cyclicized bodies of petroleum origin tending to minimize engine knock, the proportion of such cyclicized bodies being predetermined for the purpose and with the result of reducing engine-knock to a considerable degree. Or stated in another way, the invention concerns a self-adjusted motor fuel comprising cracked gasoline preferably containing heavy ends productive of engine-knock and including an influential proportion of petroleum-generated thermolytically-cyclicized bodies; said bodies and compounds being proportioned in a predetermined manner for the purpose and with the result of minimizing engine knock. The invention also embraces the process of producing a self-adjusted motor fuel comprising cracked gasoline containing heavy ends productive of engine-knock and including an influential proportion of petroleum-generated thermolytically-cyclicized bodies; said bodies and compounds being proportioned in a predetermined manner for the purpose and with the result of minimizing engine knock to a considerable degree; said fuel preferably having a boiling range falling within limits such as from about 130° F. to 450° F.

The following will illustrate one method of carrying out the invention.

An oil which is considerably heavier than gasoline, as for example gas oil, is warmed or preheated by means of a heat exchanger and the preheated oil is passed by means of a force pump into and through a long coil of pipe placed over a strong fire so that the oil in passing through the coil will be heated to a temperature of say between 700° F. and 900° F., a temperature of 800° F. being satisfactory. The oil discharges from the coil into a soaking tank preferably situated above the coil so that the heat from the fire which is unabsorbed by the coil will supply additional heat to the soaking tank. The apparatus is maintained under a pressure preferably of between 250 and 350 pounds above atmospheric pressure. If desired also a small proportion of air may be admitted with the oil at the force pump or air may be forced into the soaking tank. This serves to raise the temperature more rapidly, helps to build up an initial pressure and has a beneficial action in some cases on oils containing sulphur. The strong heating in the coil and the further digestion of the oil in the soaking tank under pressure results in a high yield of gasoline and kerosene.

The vapors or cracked distillation products coming from the soaking tank or other cracking apparatus preferably are dehydrogenated soon after withdrawal from such cracking apparatus while the vapors are still hot enough to react readily with air or oxygen, either with or without the aid of catalytic material. By utilizing the gases at a temperature approaching that employed in the cracking step it does not become necessary to employ special heating devices and to use additional fuel for the purpose. The reaction with the air or oxygen or other oxidizing gas is exothermic and heat is therefore developed which may be utilized by passing the vapors through a heat-exchanger wherein raw oil for cracking is warmed or preheated and thereby put in readiness for introduction into the heating coil forming a part of the cracking apparatus.

In some cases it may be desired to remove the heavier portions, tars and the like, prior to treatment with air or oxygen and for this purpose a dephlegmator may be situated intermediate the soaking tank and the chamber or flues in which dehydrogenation occurs. The removal of some of the heavier or tarry material may be advantageous when a catalyzer is employed in the dehydrogenation step.

The dehydrogenation may be carried out by simply admitting air at one or more points in a flue or chamber through which the vaporized distillate is passing; the temperature at this point being such that a substantial utilization of the oxygen takes place. Preferably the air is admitted at a plurality of points along such flue or conduit. In this conduit there may be situated a bed of catalytic material such as fragments of iron coated with vanadium oxide, granular aluminum coated with a mixture of molybdenum and vanadium oxide or other appropriate catalytic material, preferably in a loose granular form, allowing the vapors and gases to pass through readily. In other cases metallic gauze, wire or balls, fragments of pumice, quartz, fire brick or other refractory material may be placed in the flue or flues. The latter preferably are set vertically with the vapor and gas mixture passing downward therethrough and being drawn off at the bottom to condensers. The condensation may take place at atmospheric pressure if desired, although preferably such condensation is carried out at pressures above atmospheric. Between the dehydrogenating flues or chamber and the condensers there may be placed dephlegmators or heat-exchangers as desired. The dephlegmators may discharge their heavy portion back into the cracking apparatus. A battery of cracking apparatus with a centralized dehydrogenating chamber may be used in some cases, especially when the arrangement is such that the drop in temperature is not prejudicial.

The cracking apparatus preferably as noted is intended to operate under a pressure of from 250 to 350 pounds above atmospheric pressure. In general I prefer, as stated in U. S. Patent 1,516,720, filed Dec. 17, 1921, to use a pressure of at least 10 atmospheres and preferably between 10 or 20 atmospheres or higher, according to conditions. Much higher pressure may be used, if desired.

In some cases the steps both of cracking and dehydrogenating may be carried out in the vapor phase at atmospheric pressure or at pressures above atmospheric, for example at four or five atmospheres. Another modification is that of causing the cracking to take place at atmospheric pressure and dehydrogenation to progress at a higher pressure. Again the procedure may be carried out in a reverse way, that is cracking is effected at a pressure above atmospheric and dehydrogenation is conducted at atmospheric pressure. By conducting as separate steps the operation of cracking and that of dehydrogenation it is possible to have differential pressures best adapted for the particular operation in hand.

Pressures below atmospheric are not precluded in either step but are not recommended.

When cracking and condensation are together carried out under approximately the same pressure, e. g., three or four atmospheres above atmospheric pressure, dehydrogenation may be conducted at any point in the condenser line at such a distance from the cracking coil, tank or still that a suitable temperature exists which may tend to direct the reaction toward the particular type of reaction product desired. In so complicated a mixture as that of cracked oil it is, of course, not possible to provide conditions which will produce any one compound or restricted type of compounds exclusively but conditions may be directed to yield an influential amount of a specified compound or group of related compounds in some cases.

When cracking takes place under considerable pressure and condensation is at a substantially lower pressure or is in the neighborhood of atmospheric pressure, the dehydrogenation chamber may be under the pressure exerted in the still or cracking chamber or it may be under the pressure of the condenser line. Or two or more dehydrogenation chambers may be used in series, one or more being operated at approximately still pressure and others being at about condenser pressure.

In this way separate or differential dehydrogenation may take place under different temperatures and pressures. This may become a matter of importance in the treatment of a complex mixture of saturated and unsaturated hydrocarbons, aromatic, naphthenic and paraffin bodies and other complex substances which may be present in the cracked material and in the production of branched-chain hydrocarbons.

There may be as noted a certain amount of dehydrogenation provided in the heating coil of the cracking apparatus or in the soaking tank. Oxygen may be admitted at any or all of these points. However, I prefer to carry out the main dehydrogenation reaction in the vapors themselves and preferably after leaving the soaking tank because at this stage the temperature of treatment is under better control. In the heating coil and soaking tank the temperature necessarily must be that required to produce cracked gasoline, by which term I mean gasoline produced by the cracking operation. The temperature must favor cracking and not necessarily dehydrogenation. By carrying out dehydrogenation as a separate step, the temperature can be adjusted to bring about the most efficient conditions for reaction, e. g., with oxygen to produce intermediate products such as branched hydrocarbons assisting in the adjustment of the motor fuel to render the highest and most effective development of power when employed in an internal-combustion engine.

The temperature at which dehydrogenation is carried out in the case of the cracked vapors is preferably above 250° F. and preferably not in excess of 600° F. A fairly vigorous reaction may be obtained between the range 400° F. and 600° F. A temperature of incipient redness is suitable in some cases. In other cases I prefer to use a temperature which is below that of redness but is at a black heat at which the conversion progresses effectively without the formation of any excessive amount of carbon-containing ultimate products of combustion. Thus by proceeding in this manner dehydrogenation may be carried out at a temperature independent of the cracking temperatures. A more gentle treatment may be carried out at temperatures below 400° F. Under these circumstances a special orientation of oxidation may be effected. Temperatures between 250° F. and 500° F. may be employed when the object primarily is that of yielding motor fuels of reduced smoke-forming tendencies and a lower carbonizing disturbance in engine cylinders.

In this connection it may be noted that those bodies which produce smoky flames or are recognized in the gas industry as "illuminants", including the ethylenes and other substances, oxidize with relative ease. These may be converted by gentle oxidation to partial or intermediate combustion products and a diminution in carbon deposition in engine cylinders may be expected when the fuel is employed for the generation of power by means of internal-combustion engines.

If the heat development in the dehydrogenation zone becomes too great, the temperature may be reduced by cooling coils and the excess heat may be employed to advantage in preheating the raw oil.

The rate and character of reaction with oxygen is modified by pressure. Dehydrogenation in this illustrative manner under pressure is more vigorous and therefore requires more adequate control. The production of partially dehydrogenated products may at ordinary atmospheric pressure develop so little heat as to fail to be self-sustaining, while at a pressure of several atmospheres self-sustaining heat conditions may result or the heat development may become excessive and call for cooling.

Treatment with oxygen of petroleum oil and especially cracked material containing "illuminants" under superatmospheric pressure, for example, a pressure say of three or four atmospheres above atmospheric, on the one hand, up to ten or twenty atmospheres or even higher pressures is a feature included within the preferred form of the invention.

Another feature of importance in such illustrative procedure is that of admitting air or oxygen in such quantities and under such conditions that explosive mixtures are not produced. An excess of air in such an amount to cause explosions should not be employed, and preferably only a comparatively small proportion of the cracked gasoline vapors need to be dehydrogenated in order to obtain a fuel of the desired qualities. Thus while the whole body of vapors from the soaking tank, other than that portion which has been removed by dephlegmation, may be passed through the dehydrogenation zone with a moderate amount of air, preferably introduced at a series of places to avoid any localized combustion and explosion, only a small amount of such vapors, say 5 or 10 per cent, need to be actually dehydrogenated and if the conditions are such that the air is admitted in a uniform and well-distributed manner the combustion of the more sensitive or more easily oxidized substances present may take place, resulting in a more stable form of motor fuel. It is well known that cracked gasoline contains various substances which may be of the acetylene type or conjugated diolefins or bodies possibly of the nature of cyclodienes which resinify easily and such gum formation occurring in the finished gasoline gives rise to trouble. In one form of my invention it is an object to carry out the treatment with oxygen in so well-regulated a manner that these sensitive bodies may become oxidized and instead of detracting from the quality of the fuel by forming gummy deposits therein at some subsequent time I propose to utilize these bodies in an oxidized form to assist in reducing engine knock and to diminish the tendency to formation of carbon deposits in the engine cylinders.

In the drawing Fig. 1 is a flow diagram which depicts partly in vertical elevation and partly in section in purely diagrammatic form an apparatus which may be used in carrying out the invention. Fig. 2 shows a modified portion thereof.

In Fig. 1, 1 represents the inlet through which the oil to be treated flows. The oil passes through a heat exchanger 2 and is forced by means of pump 4 into the cracking coils 5 set in furnace 6. Passing from the cracking coils through valve 7, which controls the rate of flow, the oil enters a soaking tank 8 where the cracking treatment continues towards equilibrium conditions, and passes from this tank by pipe 10 at a rate and pressure controlled by valve 11 into dephlegmator 12, where tars and the like are separated through line containing valve 13. From the dephlegmator by way of pipe 14, the vapors pass into the dehydrogenation chamber 16 into which air or oxygen is admitted at inlet 17. The products of the dehydrogenation treatment pass in heat-exchange relation with incoming oil and through valve 20 into condenser 21, the condensate passing into trap 21 and the gases through line 23 under control at valve 24 to storage.

Fig. 2 represents a modification in which the dephlegmator is omitted. The numbers relate to corresponding parts in Fig. 1.

If desired, small amounts of air can be admitted to the oil at inlet 3, prior to cracking; and to the soaking tank at air inlet 9.

The crude motor fuel collected by condensation after the dehydrogenation process may contain too large an amount of heavy ends, that is kerosene and other bodies, and preferably it is submitted to distillation to obtain a naphtha boiling from say 100° F. to 450° F. Another boiling range is between 130° F.–440° F. Still others may be used. It is one object of the preferred form of the present invention to employ a somewhat higher proportion of heavier ends, that is kerosene or dehydrogenated kerosene, than is feasible in a motor fuel which is not of the self-adjusted type. Hence I may in some cases employ a boiling range which extends up to 500° F. or thereabouts. The initial boiling point may vary considerably depending upon whether the motor fuel is to be used in summer or winter weather, lighter boiling constituents being desired in the latter case. In any case, the boiling range preferably should not extend above 500° F. In the summer season a motor fuel containing a larger proportion of kerosene, say up to 30 per cent or so, may be employed, while in the winter season a lesser amount of kerosene is desirable. Furthermore, during the winter season the consumption of kerosene for other purposes is greater, hence adjustment made in this manner is quite feasible from a commercial standpoint.

The crude dehydrogenated naphtha obtained in this manner may be used without refining in some cases or it may be treated with concentrated or diluted sulphuric acid followed by caustic soda treatment and, if desired, by the "doctor" treatment. Hypochlorous acid or hypochlorites may be used for refining in some cases.

As previously mentioned, only a comparatively small proportion of the cracked gasoline vapors need to be dehydrogenated in order to obtain a fuel of the desired anti-knock qualities. On the other hand, as pointed out in my co-pending application Serial 629,799½, the cracked gasoline vapors may be treated with a maximum amount of oxygen and the resulting product can be mixed with pressure-still, straight-run or other types of gasoline which normally show knocking, in order to reduce engine-knock caused by the latter products when used alone as a motor fuel.

From the foregoing it will be noted that the dehydrogenation of the vapors is not limited to a catalytic process. The preferred process of the present invention also comprises cracking a heavy oil such as gas oil under a pressure of at least 10 atmospheres above atmospheric pressure, and admixing some portion at least of the products of cracking, prior to cooling below a reactive temperature, with air insufficient in amount to form an explosive mixture. In one form of the invention such mixture is brought into contact with catalytic material.

For dehydrogenation by means of oxygen the supply of oxygen may be air or air which has been enriched with oxygen, or substantially pure oxygen may be employed. Oxygen may be derived by the liquefaction of air and the nitrogen separated may be employed to make synthetic ammonia by catalytic combination with hydrogen derived from still gases in the manner recited in certain of my co-pending applications.

When air is directly employed for dehydrogenation, or when a mixture of air and stack gases is used the uncondensed gases liberated from the condensers may be superheated or cracked at a high temperature to obtain an impure mixture of nitrogen and hydrogen which may be purified and employed in making synthetic ammonia.

Furthermore it may be noted that the reactions resulting from adding cold air to very hot cracked vapors may be quite different from those occurring when the vapors at a lower temperature are mixed with preheated air; the latter, for example, being admitted at the same temperature as the vapors. Thus the treatment of the vapors as they come from the cracking still at a high temperature with air at room temperature would theoretically, on the basis of sensible heat and excluding any combustion, give a certain temperature average and is not likely to afford the same type of reaction as would be obtained by mixing preheated air with vapors having the same temperature as that theoretically obtained by the above mixture. Hence there are several variables the control of which requires considerable attention in the orientation of desired reactions.

There may be circumstances, furthermore, when cracked gasoline which has been condensed may have to be vaporized and dehydrogenated in accordance with the foregoing. Purification to remove sulphur may be carried out prior to dehydrogenation if in the latter step a catalyst is used which is poisoned by sulphur.

According to the foregoing it will be observed that I specify cracking as a separate step in order to have dehydrogenation carried out under controllable conditions independent of those required in cracking. It should be understood, however, that it is possible that some cracking may go on at the temperature maintained in the dehydrogenation zone when dehydrogenation is carried out in the vapor phase as a step separate from that of cracking. The degree of cracking ordinarily is of an incidental character as the period of exposure to air or oxygen outside of the cracking still is normally brief in comparison with the period of treatment given to the oil in the cracking step proper. Thus while the treatment of a charge of oil to crack it may require a considerable number of hours, the vapors leaving the cracking still may pass through a dehydrogenating zone wherein they are exposed to the action of an oxygen-containing gas for a period of only a few seconds or a few minutes. The action of oxygen generally speaking is considerably accelerated and to some extent oriented by the use of catalyzers.

The foregoing procedure of cracking under pressure and treatment of the cracked product with oxygen under dehydrogenative conditions results in modifying the resulting motor fuel by supplying cyclic bodies such as benzol and other aromatic hydrocarbons and various other cyclic substances and dehydrogenated products, branched hydrocarbons, and the like, thereby affording a self-adjustment of the composition of the motor fuel to supply correctives of combustion disturbances in the operation of internal-combustion engines.

I may add that should it be desired to carry out dehydrogenation of the vapors at a stage in the operation where the temperature has been reduced below that at which reaction with, for example, an oxygen-containing gas readily occurs, my invention does not preclude the heating of the material which is to undergo dehydrogenation to a temperature sufficient to put this into effect. In some cases it may be necessary or desirable to preheat air or other oxidizing gas if employed to supply oxygen for the dehydrogenating step.

The process of the present invention thus provides a motor spirit or motor fuel of petroleum origin preferably containing antiknock heavy ends preferably boiling up to about 500° F. present in a proportion, e. g., up to 30 per cent, which if of the raw kerosene type would cause severe engine knock.

What I claim is:

1. The process of producing a motor fuel containing a substantial amount of aromatic compounds comprising dehydrogenation of a pressure-cracked petroleum in the presence of air at a temperature of 400°–600° F. and under superatmospheric pressure less than that employed in cracking, and separation therefrom of a fraction of distillation end-point not exceeding 500° F. containing an influential amount of knock-reducing bodies.

2. The process which comprises cracking petroleum oil under a pressure above atmospheric, conveying a portion at least of the cracked products under pressure through a dehydrogenating zone, maintaining the temperature therein below that employed in cracking and within the range of 400–600° F., and separating a motor spirit of end point not exceeding 500° F., and refining said motor spirit.

CARLETON ELLIS.